(12) United States Patent
Durney (10) Patent No.: US 6,877,536 B2
(45) Date of Patent: Apr. 12, 2005

(54) JOINERY MEMBER AND FASTENER AND PROCESS AND APPARATUS FOR PLACEMENT OF THE FASTENER

(76) Inventor: Max W. Durney, 2069 Hayes, San Francisco, CA (US) 94117

( * ) Notice: Subject to any disclaimer, the term of this patent is extended or adjusted under 35 U.S.C. 154(b) by 0 days.

(21) Appl. No.: 10/759,575

(22) Filed: Jan. 16, 2004

(65) Prior Publication Data

US 2004/0146374 A1 Jul. 29, 2004

Related U.S. Application Data

(63) Continuation of application No. 09/919,182, filed on Jul. 30, 2001, now abandoned.

(51) Int. Cl.[7] .............................. B27M 1/08; B27C 1/00
(52) U.S. Cl. ....................... 144/365; 144/134.1; 408/26; 409/199
(58) Field of Search ................................ 144/353, 367, 144/134.1, 1.1, 365; 403/8, 10, 408.1; 29/525, 525.01

(56) References Cited

U.S. PATENT DOCUMENTS

| | | | | | |
|---|---|---|---|---|---|
| 3,664,011 A | * | 5/1972 | Labastrou | ................... | 144/347 |
| 4,603,719 A | * | 8/1986 | Durney | ....................... | 144/365 |
| 4,909,012 A | * | 3/1990 | Thompson et al. | ...... | 52/745.21 |
| 4,944,627 A | * | 7/1990 | Durney | .......................... | 403/8 |
| 5,063,982 A | * | 11/1991 | Durney | ....................... | 144/365 |
| 5,553,645 A | * | 9/1996 | Durney | ....................... | 144/365 |

* cited by examiner

Primary Examiner—Allen Ostrager
Assistant Examiner—Shelley Self
(74) Attorney, Agent, or Firm—Dorsey & Whitney LLP (57) ABSTRACT

A device (41) for positioning a joinery fastener (74) in a joinery member (33) for later use in forming a joinery assembly. The fastener positioning device (41) includes a feed magazine (82) formed for feeding joinery fasteners (74) to a gripping apparatus (83). The gripping apparatus (83) is positioned to receive the fasteners (74) and is further adapted to releasably grip individual fasteners (74) at a position (103) below the fastener head (86) to hold the fasteners (74) in a known and controlled, indexed relation to the gripping apparatus (83). The gripping apparatus is movable between a fastener gripping position to a fastener placement position while the pointed end (88) of the fastener (74) remains in indexed relation, and a placement arm (92) is formed to urge the fastener (74) from the gripping apparatus (83) and into interference fit with the joinery member (33). A joinery member (33) having a fastener (74) mounted in interference fit with a bore (68) therein is also disclosed, as is a preferred form of pocket screw fastener (74), a fastener-receiving bore (68) with an elongated transverse cross section and a process for automatically positioning fasteners (74) in joinery members (33) for later joining to another member.

30 Claims, 9 Drawing Sheets

JOINERY MEMBER AND FASTENER AND PROCESS AND APPARATUS FOR PLACEMENT OF THE FASTENER

The present application is a Continuation and claims priority under 35 USC §120 to U.S. patent application Ser. No. 09/919,182 filed Jul. 30, 2001 now abandoned.

TECHNICAL FIELD

The present invention relates, in general, to joinery members which are secured together using fasteners, such as wood screws, and more particularly, relates to pocketed joinery members and the positioning of the wood screws in the screw pockets for subsequent securement of the joinery member to a second member.

BACKGROUND ART

Many commercially manufactured cabinet and furniture products are formed from a plurality of wooden, composite or plastic members which are joined together by a plurality of fasteners, most usually wood screws. In many instances, the wood screws are positioned in screw pockets or mortises formed in the joinery member adjacent to an edge of the member, which edge is then secured to a second joinery member.

Figure 1:
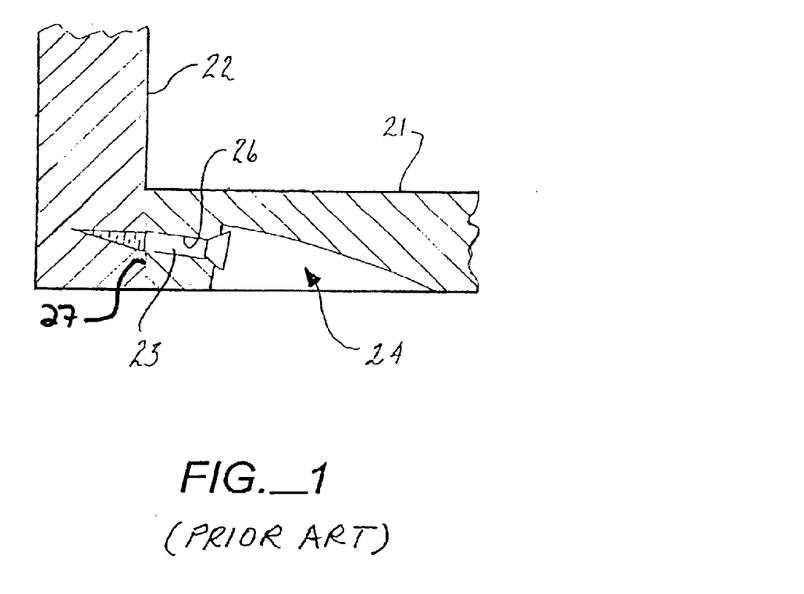
FIG. 1 is a fragmentary, side elevation view, in cross section of two joinery members secured together by a pocket screw as is known in the prior art.

A typical prior art cabinetry or furniture joint is shown in FIG. 1. A first joinery member 21 is shown in abutting relation to a second member 22. First and second members 21 and 22 are secured together by a fastener, in this case a wood or pocket screw 23, which is mounted in a pocket 24 in the first joinery member. A bore 26 extends from edge 27 of the first joinery member to pocket 24, and screw 23 is positioned in bore 26 and screwed into the second joinery member 22 to secure the assembly together as a unit. Typically, a plurality of fasteners 23 will be used along the length of the two members being joined, and second member 22 may be provided with pre-drilled holes or bores which receive the screws and make driving of the same easier. Pocketed securement together of two joinery members is often employed to join face frames of various structures, but it also can be employed to secure panels together and combinations of panels and frame members.

The formation of screw pocket 24 can be accomplished using various types of equipment. One of the most efficient ways of forming pocket 24 and bore 26, however, is set forth in my U.S. Pat. No. 4,603,719. Subsequently I have devised a hand-held screw pocket forming apparatus, which is shown in my U.S. Pat. No. 5,063,982, and pocket or mortise inserts are shown in my U.S. Pat. No. 4,944,627.

If the number of members to be joined together is relatively small, the apparatus of U.S. Pat. Nos. 4,603,719 and 5,063,982 can be employed, and the wood working fabricator can manually place fasteners or pocket screws 23 into pockets 26. In the do-it-yourself or low volume contexts, therefore, it is relatively easy and not too time consuming to simply manually position the pocket screws for screwing into the other joinery member using a powered or unpowered screwdriver.

In high production situations, however, fabrication lines need to be partially or fully automated, and one of the most difficult tasks in a joinery production line is to automate the positioning of fasteners in the joinery members so that they can be fastened together using a power screwdriver. It is highly undesirable in high production applications, therefore, to form the pocket 24 and bore 26 automatically and yet have to employ manual labor to insert fasteners in the bores for subsequent powered screwing together of the joinery pieces.

Several problems are encountered which make automating a joinery production line difficult. One is the need to move the joinery members during the process. Such movement will tend to cause fasteners to vibrate or fall out of the pockets before they can be screwed into another member to join the two members together. Another problem is the need to control the orientation and location of the pointed ends of the fasteners or pocket screws. Thus, automated placement of wood screws in small diameter bores, such as bore 26, can be difficult. Such placement requires that the pocket screw pointed end be aligned with the bore within relatively close tolerances so that the fastener will not be jammed into the end wall of the pocket adjacent to bore 26 and thereby shut down the production line.

While existing pocket screws are suitable for use in high production applications, using the apparatus and process of the present invention, such conventional pocket screws or wood screws are not formed in a manner which makes them ideal for the present process and apparatus. Moreover, conventional screw pocket forming apparatus, including my prior U.S. Pat. Nos. 4,603,719 and 5,063,982, produce pockets or mortises having a screw receiving bore 26 which also is somewhat less than ideal for use in the present apparatus and process.

Accordingly, it is an object of the present invention to provide an apparatus and process for automated placement of fasteners, and particularly pocket screws, into joinery members for subsequent fastening together of the joinery members in a high production setting.

A further object of the present invention is provide an improved pocket screw construction which enhances placement of the pocket screws in joinery members in a production line for subsequent formation of joinery assemblies.

Still a further object of the present invention is to provide an improved pocket screw which is better suited for joining pocketed joinery members.

The process, apparatus and resulting joinery member of the present invention have other objects and features of advantage which will become apparent from, or are set forth in more detail in, the accompanying drawing and following Best Mode of Carrying Out the Invention.

DISCLOSURE OF INVENTION

In one aspect of the present invention, a joinery member having a fastener pocket and a fastener positioned in the pocket is provided. The joinery member has a fastener pocket formed therein proximate an edge of the member and a fastener-receiving bore extending from the pocket to an edge of the member. A fastener, having a shank portion, is mounted in the pocket with the shank portion mounted in interference fit with the fastener-receiving bore to retain the fastener in the pocket before securing the fastener to a second joinery member. Most preferably, the fastener is mounted in the pocket in a position entirely inwardly of the surface of the joinery member in which the pocket is formed and entirely inwardly of the edge to which the fastener-receiving bore extends.

In another aspect, a process for forming a joinery assembly is provided which comprises, briefly, of the steps of forming a fastener-receiving bore in the joinery member; and thereafter mounting a joinery fastener, having a point end, in the fastener pocket with the pointed end of the fastener extending into the bore and the fastener being frictionally secured in interference fit with the bore, most preferably by a shank portion of the fastener. The process preferably is accomplished by first forming a fastener pocket in a surface of the joinery member proximate and spaced from an edge thereof and then forming the bore to extend between the pocket and the edge.

In a further aspect of the present invention, a joinery pocket screw is provided which comprises, briefly, a monolithic screw body formed with a head, a shank extending away from the head and a threaded pointed end extending away from the shank. The shank has a shank diameter greater than the widest diameter of the threaded end, and the head is formed with a plurality of annular steps of increasing diameters stepping outwardly from the shank.

An additional aspect of the present invention is to provide a joinery member having a non-cylindrical fastener-receiving bore with an oval cross section in which a large diameter extends across a relatively small thickness dimension of a joinery member and the small diameter is substantially perpendicular thereto that extends along a relatively large width dimension of the joinery member.

A process for positioning a fastener in a joinery member for subsequent securement to a second joinery member also is provided. The fastener has a head, a body and a distal end for securement to the second member. The fastener placement process is suitable for automated, high production apparatus and is comprised, briefly, of the steps of feeding the fastener to a gripping apparatus; manipulating the fastener to a known orientation; gripping the body of the fastener while in the known orientation with the gripping apparatus; moving the gripped fastener to a fastener placement position proximate the joinery member while maintaining the fastener in the known orientation; and displacing the fastener from the placement position into contact with the joinery member for securement to the joinery member.

Finally, a joinery fastener positioning device is provided which comprises, briefly, a positioning surface for positioning a joinery member in a known position for placement of a joinery fastener in contact with the joinery member; a feed magazine formed for feeding pointed joinery fasteners to gripping apparatus; a gripping apparatus positioned to receive fasteners from the feed magazine, the gripping apparatus being further adapted to releasably grip individual fasteners in a manner causing the pointed end of the fastener to be held in a known and controlled indexed relation to the gripping apparatus, and the gripping apparatus being movable between a fastener-receiving position and a fastener placement position while the pointed end of the fastener remains in indexed relation to the gripping apparatus; and a fastener placement assembly formed to urge the fastener from the gripping apparatus into contact with the joinery member, preferably into a bore in the joinery member, with the pointed end of the fastener in a predetermined, known position in relation to the joinery member.

BEST MODE OF CARRYING OUT THE INVENTION

The process and apparatus of the present invention are particularly well suited for partial or fully automated joinery applications such as the production of components or subassemblies used to form cabinetry or furniture. As used herein, the expression "joinery member" shall include wooden members, composite resin and bonded cellulose-based and/or plastic members, plastic members, and combinations of wood and plastic members. It is possible that the present apparatus and process also could be applied to metal members, particularly metals which are easily machined such as aluminum, but generally the present process and apparatus are best adapted for use with materials typically employed in a production woodworking facility to form products such as cabinetry and furniture. Moreover, the present apparatus and method are particularly well suited for high production runs in which manual steps are partially or fully automated so that a continuous production line can be established. Such a production line can be implemented by intermittently moving and stopping the joinery members at stationary processing stations or by continuously conveying the joinery members past reciprocating processing stations (jump stations) which move with the member over a short distance. Obviously, a combination of intermittent movement of both the joinery member and/or the processing equipment could also be employed, as can manual movement of members between processing stations.

Figure 2:
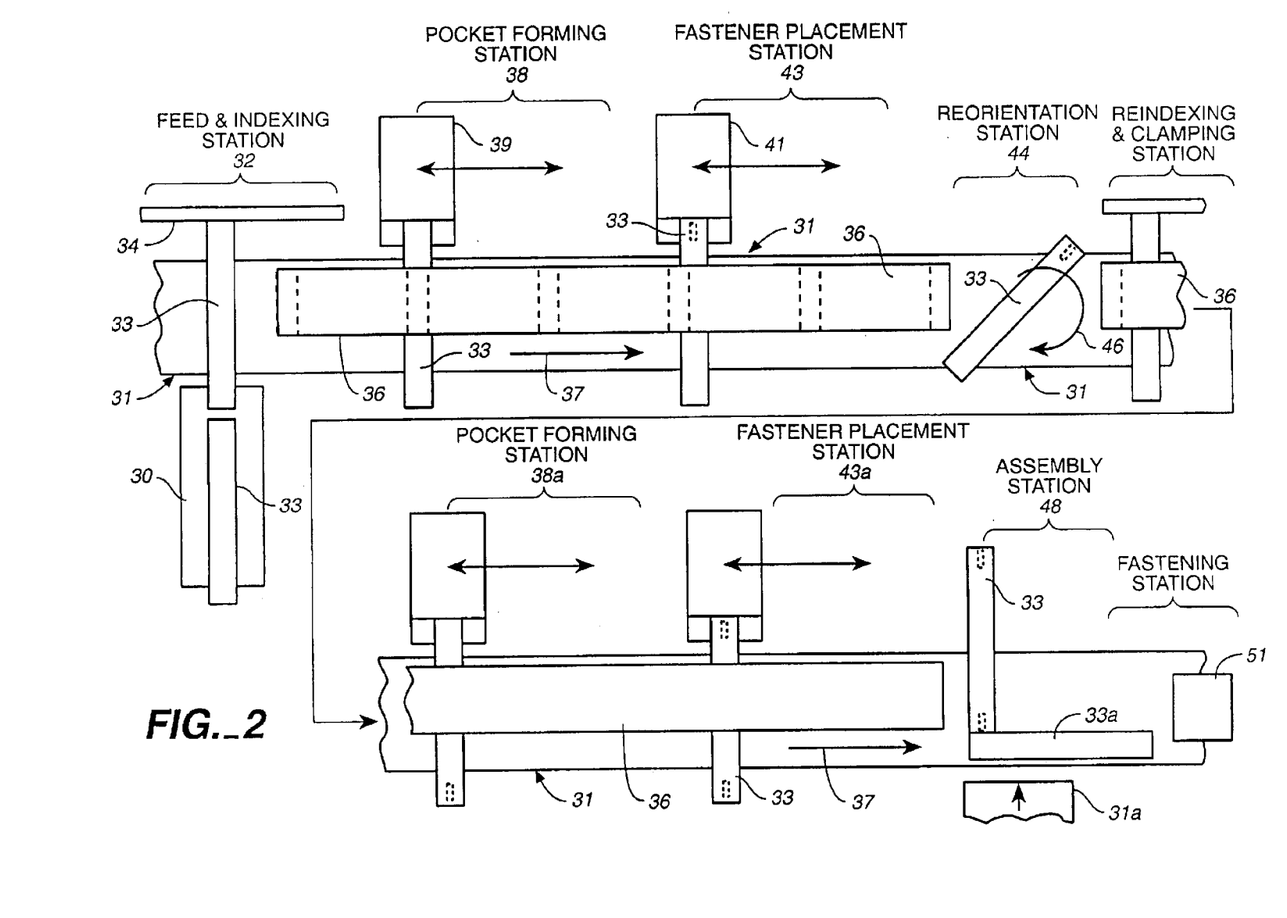
FIG. 2 is a top plan, schematic representation of an automated production line suitable for use in securing together two joinery members and including screw pocket formation apparatus and automated pocket screw placement apparatus constructed in accordance with the present invention.
Figure 3:
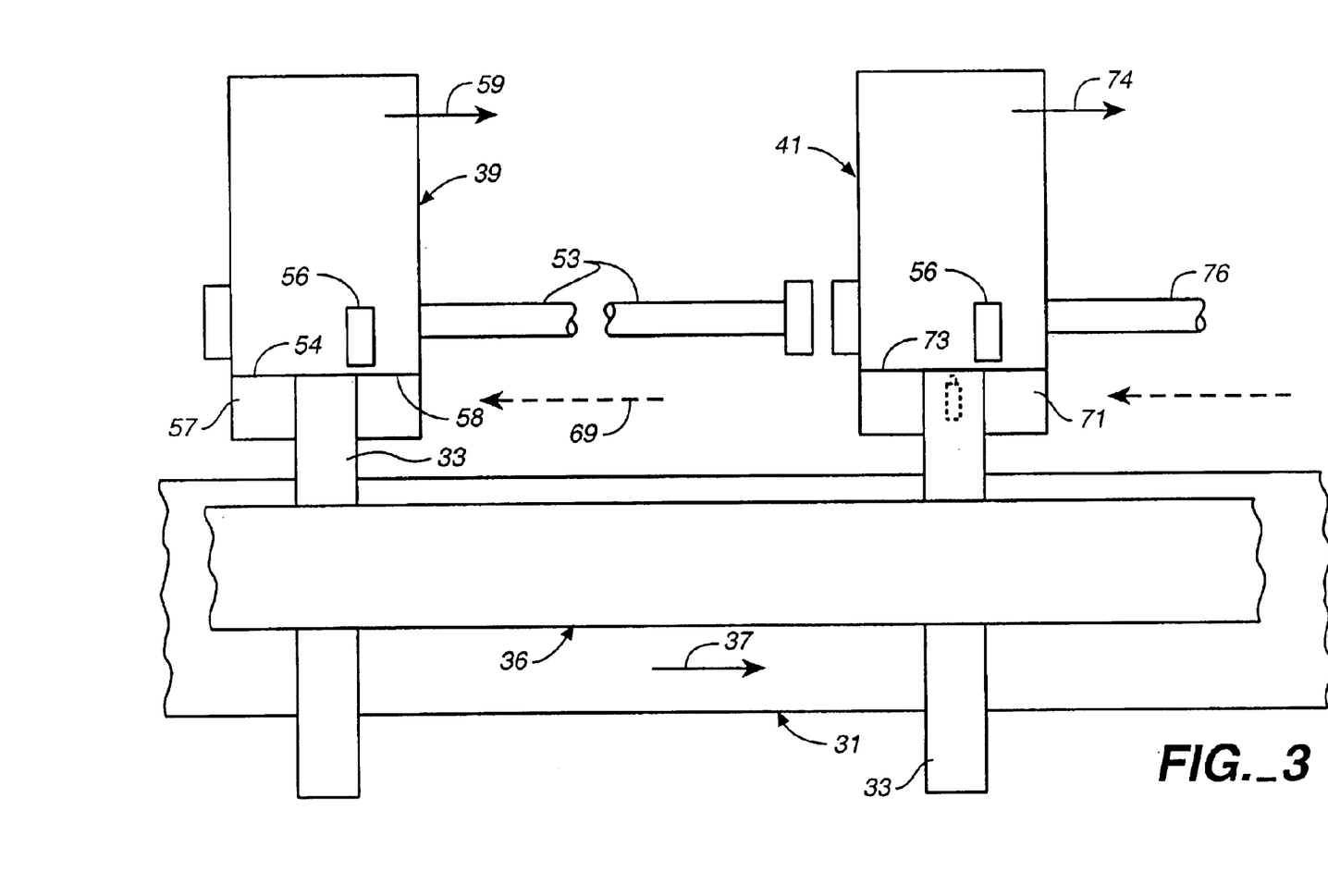
FIG. 3 is an enlarged top plan schematic representation of the screw pocket formation and fastener placement portion of the production line of FIG. 2.

Referring now to FIGS. 2 and 3, schematic representations of a processing line for the automatic joining together of two joinery members is shown. In the embodiment illustrated, the joinery members are moving on a conveyor, generally designated 31, which carries the joinery member past various processing equipment for the performance of the steps necessary to join one member to a second member.

Figure 8:
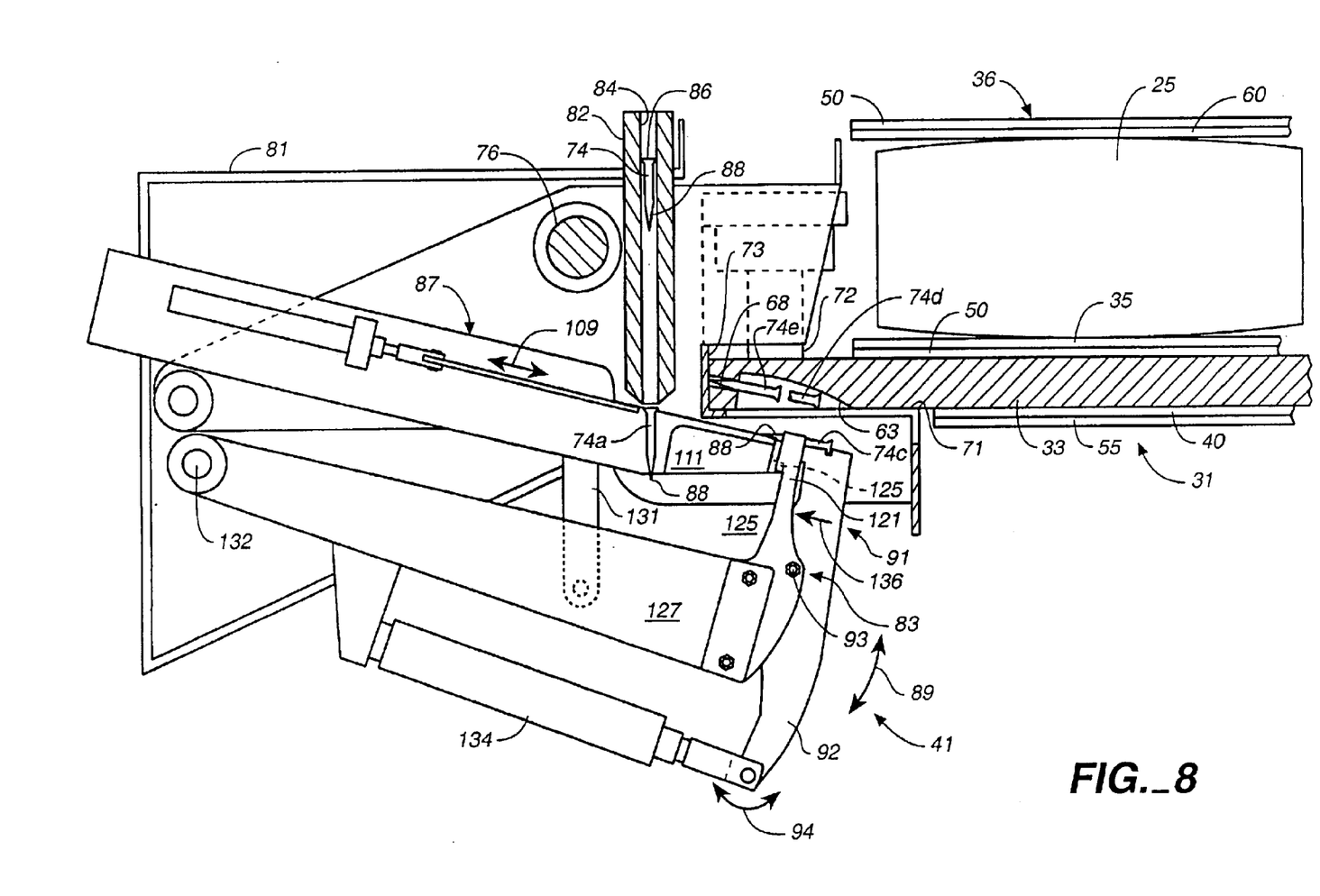
FIG. 8 is a side elevation view, broken away, of a joinery fastener placement device suitable for performing the steps of FIGS. 6 and 7 to position fastener in a screw pocket.

A typical production line might include, for example, a joinery member feed station 32 at which members 33 are fed onto conveyor 31. The feed station can include member feeding apparatus 30 and an indexing stop or fence 34 which positions member 33 relative to conveyor 31. A clamping assembly 36 clamps joinery member 33 to conveyor 31 as positioned or indexed by fence 34 so that the subsequent processing apparatus can perform various operations on member 33 as it moves along conveyor 31 in the direction of arrow 37. One type of clamping assembly 36 which can be employed is seen in FIG. 8 in which a plurality of downwardly biased rollers 25 press on a low friction platen 35 (e.g. a DELRIN sheet), which in turn clamps down on moving belt 50 that engages and displaces member 33. A low friction stationary surface 40 that is supported on conveyor frame member 55. Conveyor belt 50 returns above a second low friction platen 60 above rollers 25. Other conveyors and clamping arrangements suitable for use in the present invention and are well known in the art.

Once joinery member 33 is moving with conveyor 31 in index relation thereto, a first pocket forming station 38 may be provided, which preferably takes the form of a jump station. Pocket forming station 38 will include apparatus 39, described in more detail below, which reciprocates parallel to conveyor 31 so as to process joinery member 33 as it is being conveyed by conveyor 31. Processing is accomplished during the stroke of the jump station 38 in the direction of arrow 37, while the pocket forming apparatus 39 is reciprocated back to a start position, shown in solid lines in FIGS. 2 and 3, before the next joinery member reaches pocket forming station 38.

A fastener positioning apparatus, generally designated 41, is positioned proximate conveyor 31 downstream of pocket forming apparatus 39. At fastener-positioning station 43 fasteners, preferably pocket screws, are positioned in the pocket formed at pocket forming station 38. Again, it is preferable to employ a jump station approach at fastener-positioning station 43.

By the time joinery member 33 leaves the fastener positioning station, the joinery member, will have one or more screw pockets formed in it and fastener screws positioned in the pockets for joining of joinery member 33 to another joinery member. At a joinery member manipulation or rotation station 44, joinery member 33 can be released temporarily from conveyor clamp 36 and repositioned, for example, by rotating as indicated by arrow 46. The repositioned joinery member is then reclamped to the conveyor at clamping station 47 with the other end of member 33 in index relation to conveyor 31. Instead of rotating joinery member 33, it can also be released by clamping apparatus 36 and repositioned for processing of the opposite end of the joinery member by a processing apparatus on the other side of conveyor 31 from the pocket apparatus 39 and the fastener positioning device 41.

Release and manipulation or repositioning of the joinery members will not be required if the line is set up to process joinery members of exactly the same size. Length variations between joinery members, however, can be accommodated by the rotation or shifting and re-indexing of the opposite end of the member on the conveyor and re-clamping it while positioned against a stop. As illustrated in the FIG. 2, the line continues after manipulation station 44, and a second pocket forming station 38a, and a second fastener placement station 43a may be provided so that a pocket can be formed in the opposite end of member 33 and a fastening screw placed in the pocket.

At station 48, a second joinery member 33a can be conveyed by a second conveyor 31a onto conveyor 31, at which second member 33a abuts first joinery member 33 in a desired predetermined relative orientation. Once placed in abutting position, the two joinery members are clamped and fastened at a fastening station 49, with fastening apparatus 51 which fastens two joinery members 33, 33a together. Thus, fastening apparatus 51 can screw the pocket screw into the second joinery member 33a. Additional joinery members can be brought to conveyor 31 and joined together to form various joinery assemblies.

FIGS. 2 and 3 schematically illustrate a fully automated production line, but the apparatus and process of the present invention also may be used in a partially automated line or even a production line in which the joinery members are manually moved from one processing station to the next. In such partial or manual production lines each station can be stationary and the jump stations eliminated.

It will be apparent from the description of the illustrated automated production line, that one of the critical steps which must be performed in order for the formation and joining together of joinery members in an assembly is the placement of fasteners, particularly pocket screws, in one of the joinery members as they pass along the line. Obviously, this step also is preferably preceded by an automation formation of a screw pocket in the joinery member. The screw pocket formation and fastener placement can be described in more detail by reference to FIGS. 3–7.

In FIG. 3, pocket forming apparatus 39 can be seen to be mounted to one or more rods or a guideway 53 for reciprocation along a side of conveyor 31. End 54 of joinery member 33 will be clamped at a known, predetermined position relative to conveyor 31 by a stop or fence 34 at the feed and indexing station 32. As end 54 moves into the pocket forming apparatus 39, a sensor 56 senses when the end is positioned properly in pocket forming apparatus 39, at which point a clamp in pocket forming apparatus 39 clamps apparatus 39 to member 33, for example, by clamping it against a support surface 57, with end 54 against a vertically extending surface or stop 58. The pocket forming apparatus, therefore, is clamped to joinery member 33 and will travel with it as conveyor 31 is advanced in the direction of arrow 37. Pocket forming apparatus 39 can be synchronously powered to move with conveyor 31, or it simply be clamped so that conveyor 31, in effect, powers movement of the pocket forming apparatus in the direction of arrow 59 along guideway 53.

The form of pocket forming apparatus 39 employed in the present process and apparatus preferably is one in which the pocket is routed and a fastener-receiving bore is drilled and both functions are incorporated into apparatus 39. The details of construction of such an apparatus are not critical to the fastener placement apparatus of the present invention, but they can be based upon my U.S. Pat. Nos. 4,603,719 and 5,063,982, which are both incorporated herein in their entireties by reference. Basically, pocketing forming apparatus 39 will form the screw pocket in a bottom or downwardly facing surface of joinery member 33 and drill the fastener-receiving bore from end 54 to the routed pocket.

Figure 4:
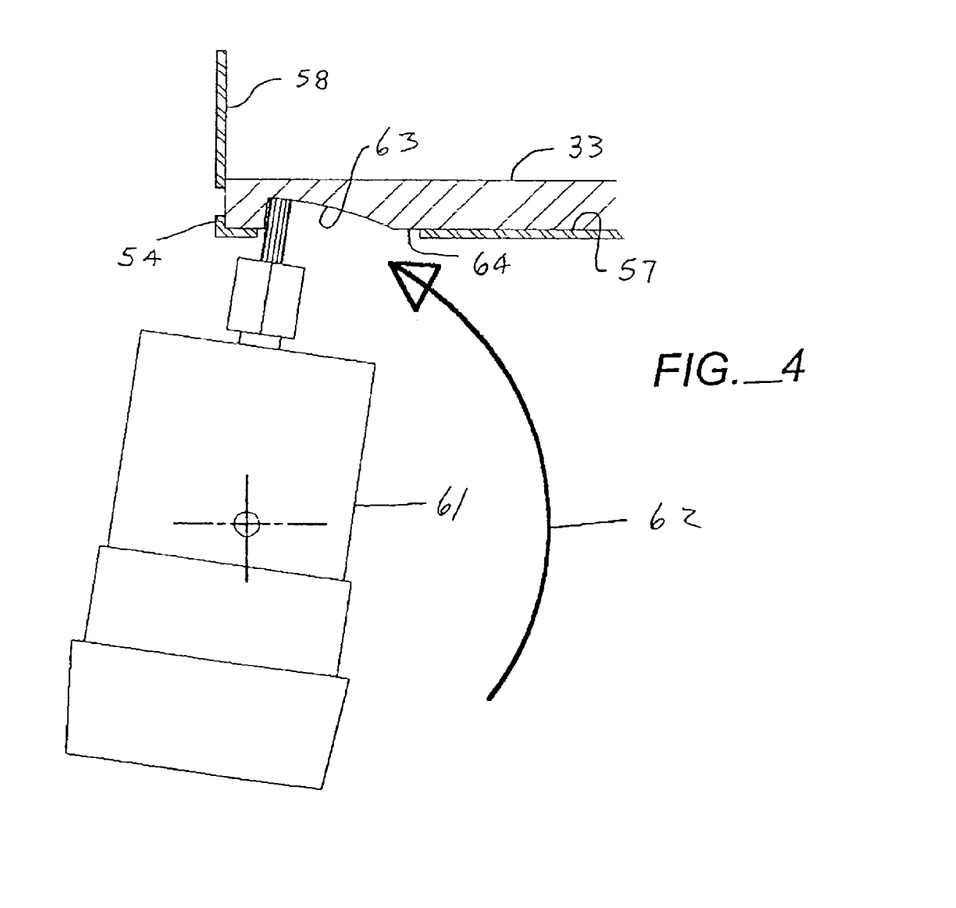
FIG. 4 is a schematic, side elevation view, in cross section, of a screw pocket formation step.
Figure 5:
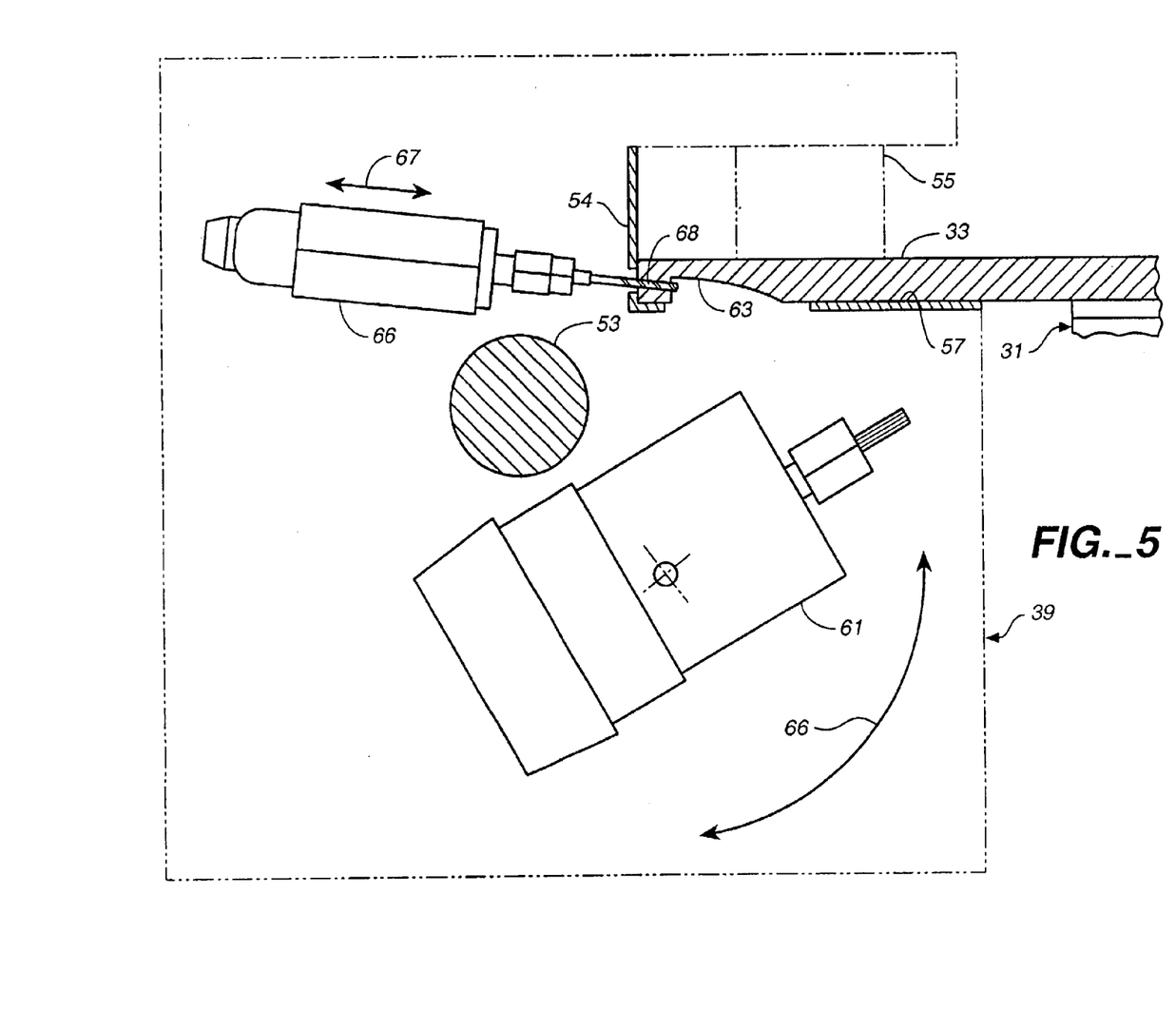
FIG. 5 is a schematic, side elevation view, in cross section, of a fastener-receiving bore formation step, showing the pocket formation apparatus in phantom.

In FIG. 4, a router 61, which forms part of apparatus 39, is shown as being pivoted in the direction of arrow 62 to form pocket 63 in a downwardly facing surface 64 of joinery member 33. In a second step, shown in FIG. 5, drill 66 is advanced, as indicated by arrow 67, and drills a fastener-receiving bore 68 from end wall or edge 54 of joinery member 33 to pocket 63.

It also would be possible to form bore 68 parallel to the opposed side surfaces of member 33, instead of at a slight angle. If constructed in this manner, the pocket shape would also be changed (deepened) to enable the screw placement assembly to position the screw in a near parallel orientation to the bore for insertion.

Once pocket 63 and connecting fastener bore 68 are formed, clamp 55 of pocket forming apparatus 39 can be released to free the pocket forming apparatus for movement in the direction of arrow 69 along guideway 53 back to the solid line "start" position shown in FIG. 3. This movement could be driven, for example, by a pneumatic cylinder (not shown). Similarly, router pivoting and drill reciprocation would also be preferably pneumatically driven.

An additional optional step which can be performed once bore 68 is drilled is to stabilize the core of the joinery member around bore 68. For composite members, such as particle board, press board, agricultural board and the like, the cellulose particles inside the outer surfaces of the board may not be that strongly bonded together. Thus, an adhesive or binder material could be pumped under pressure into bore 68 to more strongly bind the particles exposed by drilling. Similarly, pocket 63 can be impregnated with a binder to stabilize the core or particles exposed by routing. Such stabilization could occur at a separate processing station (not shown) between the pocket forming station and fastener placement station, or be incorporated into the pocket forming station.

If a second or third screw pocket is to be formed in joinery member 33, a second pocket forming apparatus can be positioned immediately after pocket forming station 38. If the spacing along conveyor 31 between pockets is sufficient, pocket forming apparatus 39 can include side-by-side routers and drills so that a plurality of pockets 63, and connecting fastener bores 68, can be simultaneously formed in a side-by-side fashion at a single, but wider, pocket forming jump station 38.

It also would be possible to form a pocket, position a screw or fastener in the pocket and thereafter form a second pocket, followed by positioning of a second fastener, all while joinery member 33 is moving down the production line on conveyor 31.

In order to facilitate subsequent joining to another joinery member, it would also be possible to apply an adhesive to edge 54 of the joinery member. Thus, a two sided adhesive tape could be placed on edge 54 across bore 68. Pressure sensitive tapes and/or light-reactive adhesives also could be used. In addition to facilitating assembly such tapes or adhesives would assist in bonding the members together.

Figure 6:
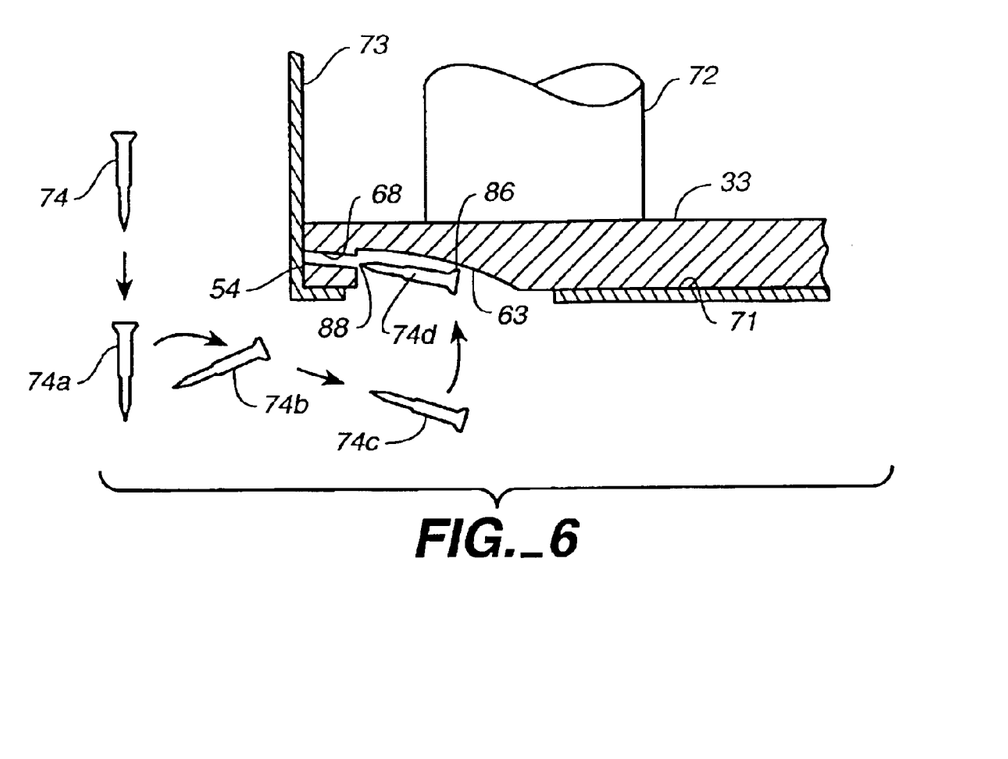
FIG. 6 is a side elevation, schematic view, in cross section, of a fastener positioning step in the process of the present invention.
Figure 7:
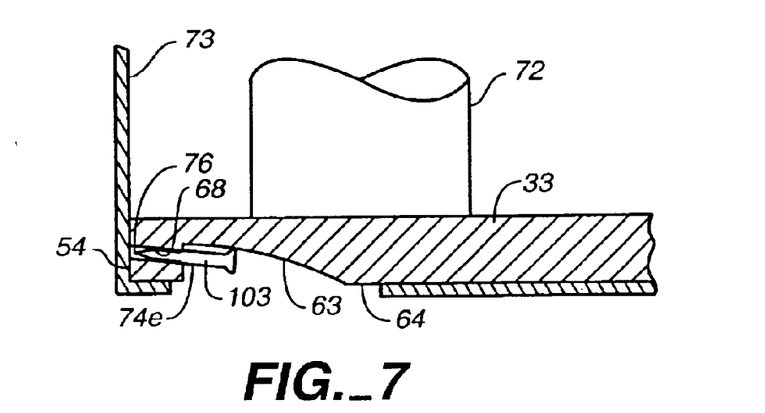
FIG. 7 is a side elevation, schematic view, in cross section, of a fastener placement step of the process of the present invention.

After pocket 63 is formed, joinery member 33 proceeds to fastener positioning apparatus 41, which is constructed in accordance with the present invention and is used to position or place a fastener, such as a pocket screw, in the joinery member for subsequent use in fastening the joinery member to another joinery member. FIGS. 6 and 7 schematically illustrate the fastener placement steps, while FIGS. 8–12 show the details of construction of the present fastener positioning device.

In FIGS. 6 and 7, joinery member 33 has been released from pocket forming apparatus 39 and advanced to positioning apparatus 41. The position of the joinery member on a supporting surface 71 will be sensed as the conveyor advances, and apparatus 41 is stationary at the start of the jump station. When properly positioned, a clamp 72 will clamp member 33 to surface 71 with the end or edge 54 against vertically extending surface or fence 73. Positioning device 41 can then travel with conveyor 31, as indicated by arrow 74 in FIG. 3, by reason of being pulled along guideway 76 by conveyor 31 or by being synchronously powered to move at the same rate as conveyor 31.

Once member 33 is clamped in position on surface 71, the fastener placement device moves a fastener from a feed magazine into fastener-receiving bore 68. In FIG. 6, a sequence of movement of a pocket screw 74 from a feed magazine into bore 68 is shown. The pocket screw first starts in a magazine position 74a. Next, it is turned by an orientation assembly described below to position 74b. The pocket screw is advanced to position 74c, at which point it is gripped by a gripping assembly, which also will be described in more detail. The gripping assembly then raises the pocket screw upwardly into pocket 63 as shown by position 74d. Finally, as shown in FIG. 7, the pocket screw is advanced into bore 68 to position 74e.

As will be seen from FIG. 7, and as is a feature of the apparatus and process of the present invention, the pocket screw, when in position 74e, will be entirely inwardly of the downwardly facing surface 64 of member 33. Moreover, the distal or pointed end 76 of the pocket screw will be entirely inwardly of the edge or end 54 of joinery member 33. When placed in this position, joinery member can be moved along fabrication support surfaces, such as conveyor 31, without pulling the pocket screw out of pocket 63 and bore 68. As will be described in greater detail below, the pocket screw is held in position 74e in bore 68 by an interference fit between a shank portion of the pocket screw and bore 68. Such a fit prevents the pocket screw from falling out of pocket 63, as well as preventing the screw from being jiggled or vibrated out of the pocket during subsequent manual or automated manipulation of joinery member 33.

Referring now to FIG. 8, the details of construction of a preferred embodiment of the joinery fastener positioning device 41 of the present invention can be described in more detail. Fastener positioning device 41 preferably includes a positioning surface or surfaces 71 and 73 upon which joinery member 33 can be placed so that fastener 74 can be moved to and mounted in bore 68 of screw pocket 63. It will be understood, however, that in the broadest aspect of the present invention, apparatus 41 could be used to position fasteners 74 in a joinery member not having a screw pocket, for example, in a joinery member having only a bore formed in a sidewall of the joinery member. The fastener would be merely placed in contact or engagement with the joinery member sufficient to temporarily secure the fastener to the joinery member for the next fastening step. Moreover, while the preferred form of fastener is a pocket screw or wood screw, it will be understood that the present apparatus could be used to position other types of fasteners to a joinery member, such as a nail or a non-wood screw.

Mounted to housing 81 of positioning device 41 is a fastener feed magazine 82, which is formed for feeding fasteners to a gripping assembly or apparatus, generally designated 83. Most preferably, fastener feed magazine can be provided as screw shaker bowl feed device, which is commercially available from several courses including Design Tools, Inc. of Hickory, N.C. The feed assembly magazine includes a vertically extending tube 82 having an internal diameter or bore 84 dimensioned to slidably receive enlarged heads 86 of pointed fasteners 74. Feed magazine 82 is provided with a pneumatic system which transfers screws to tube 82 one-by-one from the orienting shaker bowl in a point first orientation.

Gripping apparatus 83 is positioned to receive the fasteners one-by-one from feed magazine 82, and includes an orienting subassembly, generally designated 87, which re-orients the generally vertically oriented fastener 74a and to a near horizontal orientation 74c for gripping.

Gripping apparatus 83 also is adapted to releasably grip individual fasteners 74 in a manner causing pointed ends 88 to be held in a known and controlled relation to the gripping apparatus so that they can be reliably positioned in the small diameter bore 68 in the joinery member. As will be seen from FIG. 8, pointed end 88 of fastener 74 in feed magazine or tube 82 is not in contact with the interior of bore 84. Instead, tube bore 84 is contacted by enlarged head 86 and pointed end 88 of the fastener is free to be angularly displaced toward the bore sidewall from the center line of the bore. Control of pointed end 88 is critical to placement of fastener 74 in the relatively small diameter bore 68.

Thus, an important feature of the present invention is that fastener positioning device 41 of the present invention is formed to control the position of pointed fastener end 88 so that it may be accurately and reproducibly inserted into bore 68. The manner of accomplishing such controlled positioning of the pointed end 88 will be described in more detail below.

Once fastener 74 is gripped by gripping assembly 83, the assembly is further formed for movement between a fastener gripping position and a fastener placement position, all while the pointed end 88 of the fastener remains in indexed relation to the gripping apparatus. Fastener 74, therefore, is moved from position 74c to position 74d, as indicated by arrow 89. While gripped in position 74d, as can be seen in FIG. 6, pointed end 88 will be very closely aligned to the central axis of fastener-receiving bore 68 for insertion into the bore.

Fastener positioning device 41 also includes a placement assembly 91 formed to urge fastener 74 from gripping apparatus 83 into contact with joinery member 33 with pointed end 88 of the fastener in a predetermined known position in relation to the joinery member, namely, inserted down bore 68. Placement assembly accomplishes such positioning by pivoting of arm 92 about pivot pin 93, as indicated by arrow 94. The result is to urge the fastener out of the gripping assembly and into bore 68, as shown in FIGS. 7 and 8.

Figure 9:
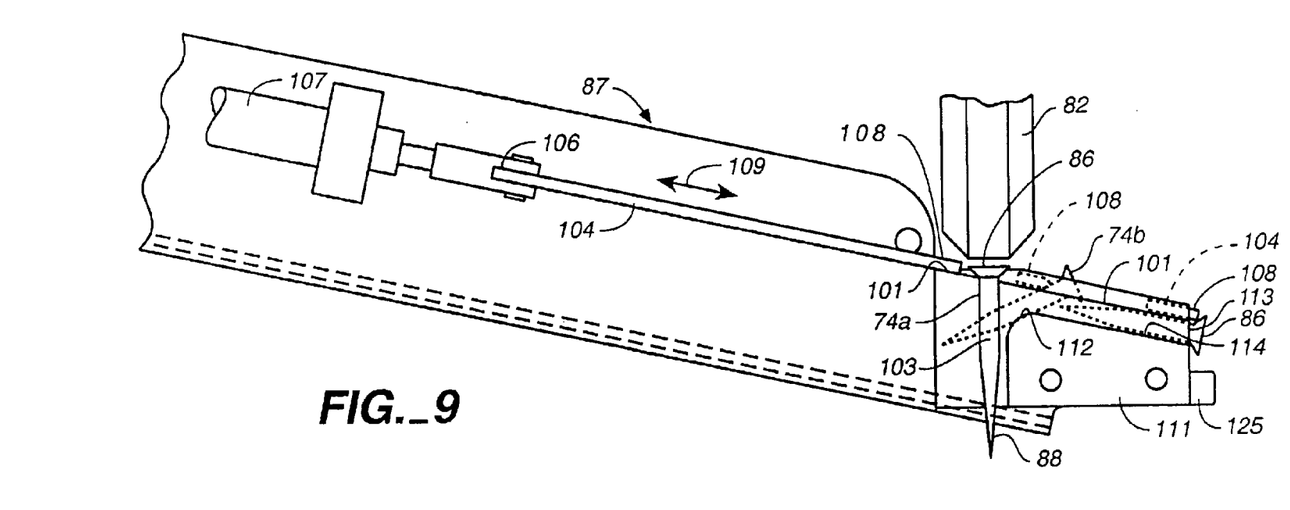
FIG. 9 is an enlarged, fragmentary, side elevation view of a fastener orienting assembly employed in the placement device of FIG. 8.
Figure 10:
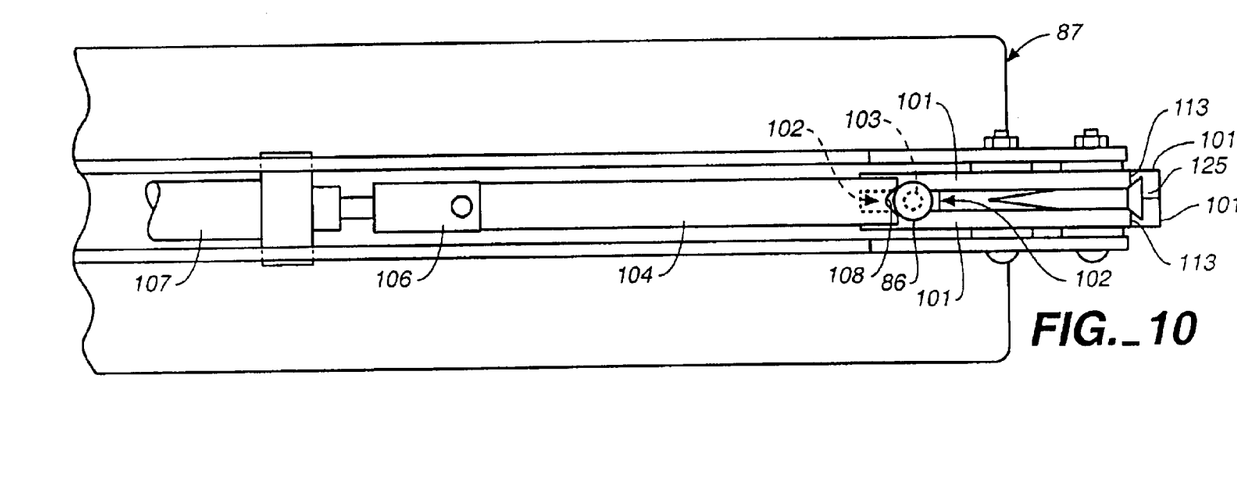
FIG. 10 is a top plan, fragmentary view of the orienting assembly of FIG. 9.

Further details of construction of gripping assembly 83 can be seen from FIGS. 9–12. In FIGS. 9 and 10, an orienting subassembly 87 is shown which receives fasteners, pointed end first, from feed magazine 82. The orienting assembly can advantageously be provided by a pair of side-by-side, parallel and spaced apart, guide rails 101 which define therebetween a fastener-receiving slot 102. Slot 102 is formed to receive the screw body or shank 103 of fastener 74 and rails 101 are spaced closely enough together to support enlarged fastener heads 86 thereon. Slot 102 between members 101 slidably receives body 103 of the fastener as it gravitates out of feed magazine 82. In the solid line position of fastener 74a in FIG. 9, head 86 of the fastener rests on parallel spaced apart rails 101 in a near vertical orientation. Movably mounted to subassembly 87 is a slide member 104 which is coupled at end 106 to an actuator 107, such as a pneumatic actuator. Opposite end 108 of slide member 104 is preferably formed with a recess or as U-shaped end which engages head 86 of the fastener. Slide end 108 can be seen to have a width dimension which is sufficient to span across 102 between the two guide members 101 and slides along the upper surfaces of rails 101.

Actuator 107 can reciprocate slide member 104, as indicated by arrows 109. When the actuator moves slide member to the right in FIG. 9, head 86 of fastener 74 is slid down the upper surface of rails 101. Mounted between rails 101 downstream of the fastener magazine 82 is a re-orienting member 111, which preferably has an arcuate front upper surface 112. As the fastener and head 86 are moved to the right, the shank or body 103 of the fastener engages surface 112 and tilts or rotates fastener 74 to position 74b, as shown in broken lines in FIG. 9. Slide 104 continues to advance fastener 74 until head 86 passes beyond the ends 113 of rails 101. The fastener head drops down and the fastener is supported on the upper surface 114 of re-orienting member 111.

As can be seen at the right end of FIG. 9 in broken lines, the end 108 of slide member 104 still engages the enlarged head 86 of fastener 74. Further displacement of slide member 104 to the right, therefore, continues to slide fastener 74 along re-orientation member 111 and to a position between a pair of spread apart gripping fingers 121, which may be seen in FIGS. 11 and 12. Fastener 74 is supported on upwardly facing surface 114 of the re-orientation member 111 and on upwardly facing surface 122 of placement arm 92, which is aligned with and at the same level as surface 114. As the enlarged head 86 is advanced by slide member 104 to the right, fastener head 86 reaches a notch 124 in arm 92, and fastener 74 is then oriented for gripping by fingers 121 in a predetermined known orientation, namely, as supported between member 111 and arm 92. Moreover, gripping fingers 121 grip body 103 of fastener 74 below head 86.

Figure 11:
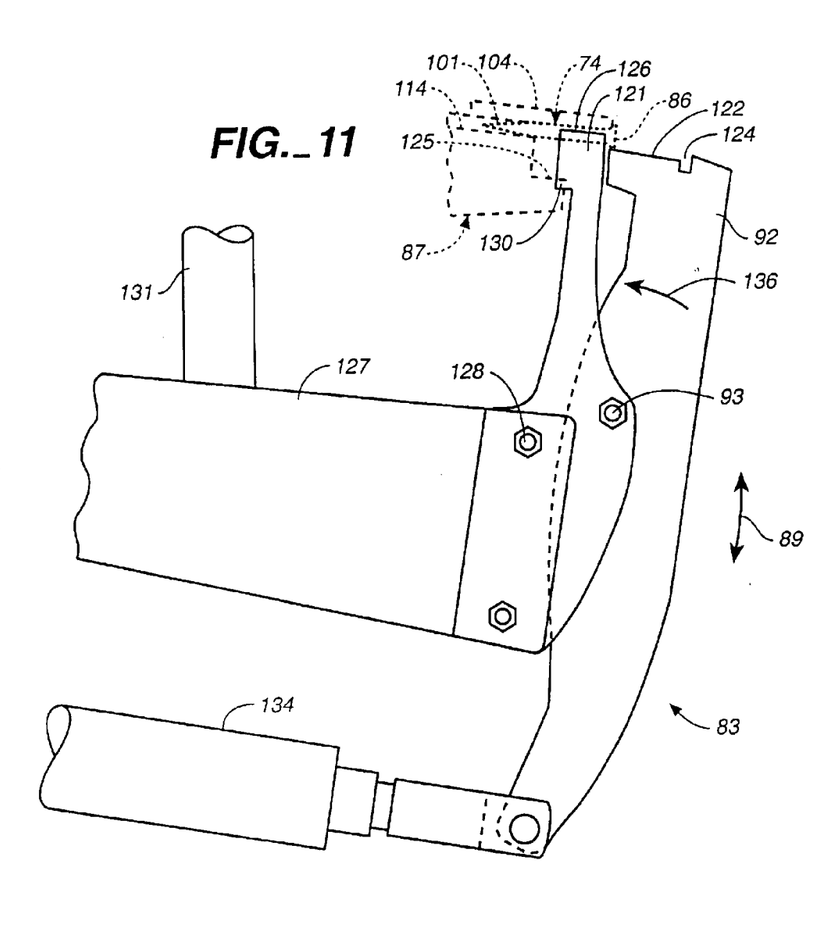
FIG. 11 is an enlarged, fragmentary, side elevation view of a fastener gripping assembly employed in the fastener placement device of FIG. 8.
Figure 12:
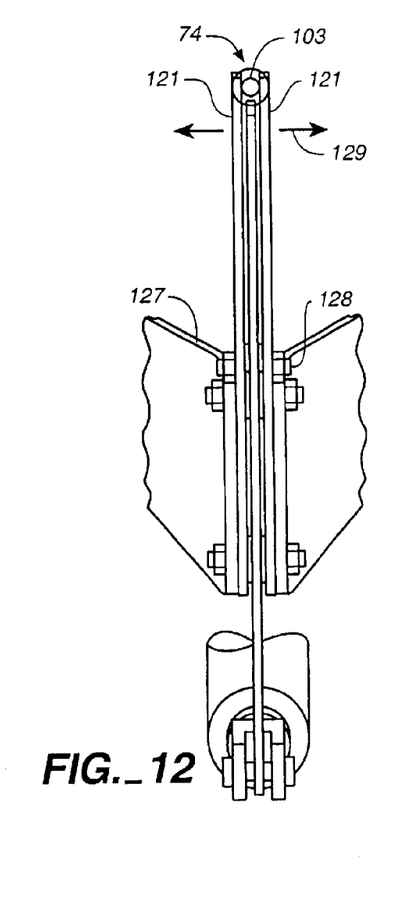
FIG. 12 is a fragmentary, end elevation view of the apparatus of FIG. 11.

In FIGS. 11 and 12, gripping fingers 121 can be seen to be cantilevered from pivotally mounted arm 127 and fingers 121 extend upwardly over a substantial distance so as to permit resilient outward displacement of fingers 121 away from each other in the direction of arrows 129 in FIG. 12. Bolts 128 can be used to secure fingers 121 to arm 127. In the relaxed condition, fingers 121 are spaced from each other by a distance which is less than the diameter of fastener body or shank portion 103. In order to open the gripping fingers 121 to receive fasteners 74, a wedge element 125 is provided on orientation assembly 87 which forces the two gripping fingers 121 outwardly from their relaxed condition, as indicated by arrows 129. As arm 127 is pivoted downwardly from support surface 71 to the position shown in FIGS. 8 and 11, a lower edge 130 of fingers 122 engages outwardly projecting wedge element 125 on the end of subassembly 87 and forces the fingers apart so as to permit slide 104 to urge the fastener to the position shown in FIG. 8. When arm 127 starts to pivot upwardly, wedge 125 is disengaged and the fingers resiliently close and grip the fastener body at a position below the enlarged head, that is, they grip shank 103 of the fastener. Since the shank is being supported on surface 122 with the head 86 in notch 124 at the time of upward motion and gripping, the pointed end 88 of the fastener is in a predetermined, known orientation when the fastener is gripped. Upon gripping by fingers 121, therefore, the fastener is held in index relation to gripping assembly 83.

Once the fastener is gripped by fingers 121, actuator 131 is used to pivot the arm 127 further about shaft 132 (FIG. 8) in an upward direction until the gripped fastener is positioned in pocket 63. The precise orientation of the fastener and its pointed end 88 is still controlled by gripping fingers 121, and pointed end 88 of the fastener will be reliably aligned with fastener-receiving bore 68.

At this point, placement arm 123 (which also is carried by arm 127 with fingers 121) is pivoted about pivot axle 93 by actuator 134. This drives arm 92 to the left, as indicated by arrow 136, which in turn urges fastener 74 from between the resilient fingers 121 and into bore 68 to position 74e, as shown in FIGS. 7 and 8. Shank 103 of the fastener then is urged into interference fit with bore 68 and the fastener is frictionally held in bore 68. Placement arm 92 can be pivoted back to the right and gripping arm 127 pivoted downwardly to open or spread fingers 121 to receive the next fastener from the fastener re-orienting subassembly 87.

With the fastener frictionally held in bore 68 in a position so that the head 86 is in pocket 63 upwardly of the surface 64 and the pointed end 88 is inwardly of the end or edge 54, the joinery member can be moved automatically or manually to the next station for further processing, for example, for positioning abutting relation to another joinery member and driving of the previously positioned fastener into the other joinery member.

As will be understood, therefore, the positioning process of the present invention is comprised of the steps of feeding a fastener 74 into a gripping apparatus 83, manipulating the fastener to a known orientation; gripping body 103 of the fastener below head 86 while in the known orientation with the gripping apparatus; moving the gripping apparatus to a fastener placement position 74d proximate the joinery member 33, while maintaining the fastener in the known orientation; and displacing the fastener from the placement position into contact, and preferably interference fit 74d, with the joinery member for securement thereto.

Figure 13:
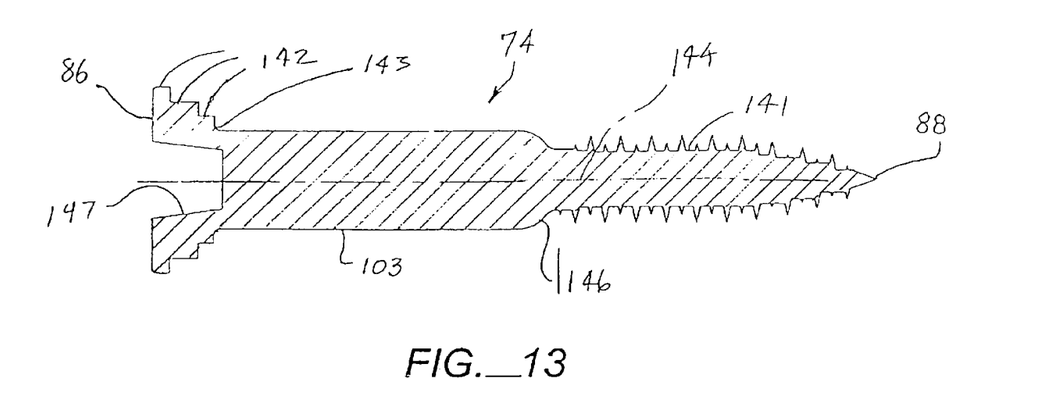
FIG. 13 is an enlarged, side elevation view, in cross-section, of a preferred form of pocket screw fastener suitable for use in the process and with the apparatus of the present invention.

While as above noted, fastener 74 may take any one of a number of different forms and still be suitable for use with the process and apparatus of the present invention, it is preferred that fastener 74 be constructed as shown in FIG. 13. Thus, fastener 74 can advantageously take the form of a monolithically formed pocket screw having a screw body 103 with a head 86, a threaded end 141 terminating in point 88. Point 88, however, can also be a blunted point if the second member receiving the screw has a bore in it sufficient to allow the blunted end to enter the second member to a depth allowing the threads to engage and pull the screw into the second member. Shank 103 has a diameter which is greater than the widest diameter of threaded end 141, which enhances the overall fastener strength and predictably produces an interference fit with the fastener-receiving bore 68.

Head 86 advantageously can be formed with a plurality of annular steps 142 which have increasing diameter and are stepped outwardly from shank 103. In the preferred form, at least three steps 142 are provided with the first step being connected by an annular fillet 143 to shank 103. Each annular step 142 includes a substantially 90° shoulder defined by a radially extending annular surface perpendicular to the longitudinal axis 144 of the fastener and a cylindrical surface which is substantially concentric to axis 144. Stepped head 86 slows pocket screw 74 down as it engages the end wall of the pocket so that the threads which are screwed into the second joinery member do not spin or over-rotate when screwed in by a power screw driver. Steps 142 also better fit the radius of the end wall of the pocket which is formed by the router than a bevel headed wood screw so that more of the head engages the end wall of the pocket.

In the most preferred form, the thread pattern on end 141 is a self-tapping thread, and the threaded end 141 is connected to shank 103 by an axially tapering section 146, which is tangential to both tapered threaded end 141 and cylindrical shank 103. The fastener can include an end structure, such as a pocket 147 which is formed to receive a straight blade, a Phillips head screwdriver blade or, in the preferred form, a square pocket formed to receive a square headed screwdriver.

The fastener shown in FIG. 13 has a threaded end which can be screwed into a second joinery member which is not previously drilled. Moreover, the tapered section 146 allows the fastener to be easily urged into interference fit with a bore 68 by a screw placement device 41 of the type described above. The relatively large diameter 103 of the shank compresses bore 68 along its length due to the interference fit and has the strength to withstand such compression. Preferably, during driving of the screw into a second un-drilled joinery member, shank 103 extends across the interface between the two joinery members so that the shear strength is high between the two. Finally, square drive pocket 147 allows substantial force to be applied to the pocket screw during the fastening process.

Figure 14:
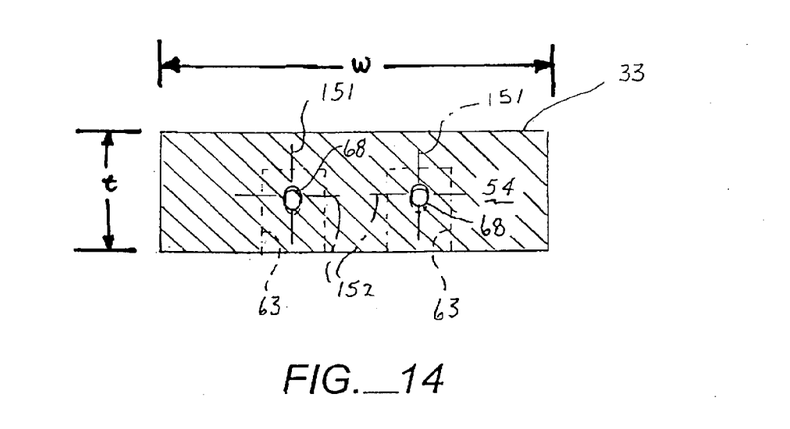
FIG. 14 is an enlarged, fragmentary, end elevation view of a joinery member having a fastener-receiving bore constructed in a manner preferred for use with the present process and apparatus.

Referring now to FIG. 14, a preferred form of fastener-receiving bore 68 is shown, which is particularly well suited for use in materials that have a tendency to split. For most wooden joinery members, the bore 68 from edge or end wall 54 to pocket 63 will be cylindrical. Composite materials and some wood grain materials, however, will have a tendency to split under the interference fit between fastener shank 103 and bore 68. Accordingly, it is preferred in those instances where splitting can be a problem that bore 68 be a non-cylindrical bore, and most preferably that bore 68 be a slightly elongated in transverse cross section bore, with a large dimension extending along long axis 151 and oriented to extend across the thickness dimension, t, of end 54. The small dimension of the elongated bore cross section is oriented along an axis 152 perpendicular to the axis 151 and extending along a greater width dimension, w, of member wall 54.

Fastener 74 will be selected such that shank portion 103 is greater than the small dimension along axis 152 of the elongated bore 68. This will allow the shank to temporarily secure the fastener in pocket 63, as above described. When the fastener is screwed into another joinery member, the shank 103 will be pulled down the length of elongated bore 68, tending to compress the material in opposed directions along the axis 152. Since there is much more material in the width dimension, w, than in the thickness dimension, t, there will be less tendency for the joinery member to split under the compressive action of the shank on the material defining elongated bore 68. In fact, the larger dimension of bore 68 along axis 151 can be selected so that there is substantially no compression occurring in the thickness direction, t. This construction of fastener-receiving bore 68 will ensure less splitting of the joinery pieces, and it can be accomplished by slightly displacing drill 66 (using an oscillating mount) in a vertical direction during the drilling step.

While an elongated cross section is shown for bore 68, it will be understood that broadly elongated bores can be advantageously used in other joinery applications. For example, the bore in the second joinery member into which pocket screw will be screwed, also advantageously can be an elongated bore oriented with the smaller diameter extending in the larger dimension direction of the member and the larger diameter of the bore extending in the small dimension direction. The elongated cross section obviously would be dimensioned based upon the thread diameter of the fastener, not the shank diameter.

What is claimed is:

1. A joinery member with fastener pocket and fastener comprising:

a joinery member having a fastener pocket formed therein proximate an edge thereof, and a fastener-receiving bore extending from said pocket to said edge; and a fastener having a shank portion and being mounted in said pocket with said shank portion mounted in said bore to, said shank portion having a diameter sufficiently greater than a diameter of said bore to frictionally retain said fastener member in said bore us a result of an interference fit with said bore.

2. The joinery member with fastener pocket and fastener of claim 1 wherein,
said fastener is a pocket screw and is mounted in said pocket in a position entirely inwardly of a surface of said joinery member in which said pocket is formed.

3. The joinery member with fastener pocket and fastener of claim 2 wherein,
said screw is mounted in said pocket in a position entirely inwardly of said edge having said bore therein.

4. The joinery member with fastener pocket and fastener of claim 1 wherein,
said fastener is a pocket screw, and
said shank diameter is larger than a threaded end of said screw.

5. The joinery member with fastener pocket and fastener of claim 1 wherein,
said bore has an elongated cross section.

6. The joinery member with fastener pocket and fastener of claim 5 wherein,
said elongated transverse cross section is oriented to extend with a small dimension of said elongated transverse cross section oriented in a direction of greatest length of said joinery member, and
said shank portion is cylindrical with a shank diameter greater than said small dimension of said elongated transverse cross section.

7. The joinery member with fastener pocket and fastener of claim 6 wherein,
said shank diameter is not larger in diameter than a large dimension of said elongated transverse cross section.

8. The joinery member with fastener pocket and fastener of claim 1 wherein,
said joinery member is comprised of at least one of: a wooden member, a composite wood-based member, and a thermoplastic member.

9. The joinery member with fastener pocket and fastener of claim 1 wherein,
said pocket is an arcuate pocket increasing in depth in a direction toward said edge and is formed in a surface of said joinery member proximate said edge.

10. The joinery member with fastener pocket and fastener of claim 1 wherein,
said joinery member is formed with a plurality of pockets each having a fastener-receiving bore extending from the pocket to an edge of said joinery member; and
a plurality of fasteners mounted in said pockets with a shank portion of each said fastener being sufficiently larger in diameter than said bore in each of said plurality of pockets to frictionally retain each said fastener in each said bore.

11. The joinery member with fastener pocket and fastener of claim 10 wherein,
said fasteners are each wood screws.

12. A process for forming a pocket joinery assembly comprising the steps of:
forming a fastener pocket in a surface of a joinery member proximate and spaced from an edge of said joinery member;
forming a fastener-receiving bore in said joinery member, said bore extending between said edge and said fastener pocket; and
thereafter mounting a joinery fastener having a pointed end in said fastener pocket with said pointed end of said fastener extending into said bore and said fastener having a diameter sufficient to frictionally secure said fastener in said bore in interference fit with said bore.

13. The process as defined in claim 12 wherein,
said mounting step is accomplished by mounting a screw having a shank portion with a shank diameter larger than a diameter of said bore into said bore to frictionally secure said screw in said bore by said shank portion.

14. The process as defined in claim 13 wherein,
said mounting step is accomplished by mounting a screw into said pocket with a threaded pointed end of said screw positioned in said bore inwardly of said edge and a head end of said screw positioned inwardly of said surface.

15. The process as defined in claim 12 wherein,
said step of forming a fastener pocket is accomplished by routing a pocket into said surface, said pocket being progressively deeper in a direction toward said edge; and
said step of forming a fastener-receiving bore is accomplished by drilling said bore from said edge toward said pocket.

16. The process as defined in claim 12 wherein,
said steps of forming a fastener pocket, forming a fastener-receiving bore and mounting a joinery fastener are all accomplished while said joinery member is being advanced along an automated processing line.

17. The process as defined in claim 16 wherein,
said step of forming a fastener pocket is accomplished by rotating a router into engagement with said joinery member while said router is advanced at a rate of advancement of said joinery member along said automated processing line.

18. The process as defined in claim 16 wherein,
said step of forming a fastener-receiving bore is accomplished by advancing a drill into said joinery member from said edge in an inwardly direction while said drill is advanced at a rate of advancement of said joinery member along said automated processing line.

19. The process as defined in claim 16 wherein,
said step of mounting a joinery fastener is accomplished by positioning a pocket screw in said pocket with a threaded end pointed aligned with said bore, and thereafter pressing said pocket screw into said pocket, with said positioning and pressing steps being accomplished while said joinery member is being advanced along said automated processing line.

20. The process as defined in claim 12 wherein,
said step of forming a fastener pocket, forming a fastener-receiving bore and mounting a joinery fastener are all accomplished by moving the joinery member from one fixed processing station to another fixed processing station.

21. The process as defined in claim 12, and the steps of:
after said mounting step, positioning said joinery member in abutting relation to another joinery member, and
securing said joinery member to said another joinery member by driving said fastener through said joinery member and into said another joinery member.

22. The process as defined in claim 12, and the steps of:
after said mounting step moving said joinery member with said fastener mounted thereto from a fastener placement station to an assembly station;

thereafter assembling said joinery member to another joinery member; and thereafter driving said fastener through said joinery member and into said another joinery member in order to secure said joinery member to said another joinery member.

23. A joinery member comprising:

a member having an end wall with a small dimension in one plane and a larger dimension in another plane substantially perpendicular to said one plane; and a fastener receiving bore with an elongated transverse cross section formed in said member and penetrating said end wall, said bore having a longitudinal axis, a large dimension oriented to extend substantially in said one plane and substantially perpendicular to said longitudinal axis and a small dimension substantially perpendicular to said large dimension, and oriented to extended substantially in said another plane and substantially perpendicular to said longitudinal axis.

24. The joinery member as defined in claim 23 wherein, said member has a thickness dimension less than a width dimension at an edge thereof, said bore extends from a pocket proximate said edge to said edge, and said large dimension of said elongated bore is oriented to extend across said thickness dimension.

25. The joinery member as defined in claim 24, and a screw having a cylindrical shank with a shank diameter greater than said small dimension of said bore and about equal to said large dimension of said bore, said screw being mounted in said pocket with said shank positioned in said bore.

26. The joinery member with fastener pocket and fastener of claim 1 wherein, said bore is non-cylindrical.

27. The process as defined in claim 12 wherein, said bore is non-cylindrical.

28. The joinery member as defined in claim 23, wherein, said bore is non-cylindrical.

29. A joinery member comprising:

a member having an end wall and a pocket proximate said end wall and a fastener receiving bore formed in said member extending from said pocket toward and penetrating said end wall, said bore having a longitudinal axis and an elongated transverse cross section with a large dimension extending in one direction and a small dimension extending in another direction intersecting said one direction, wherein each of said large dimension and said small dimension extend substantially perpendicular to said longitudinal axis.

30. The joinery member as defined in claim 29 further comprising:

a screw having a cylindrical shank with a shank diameter greater than said small dimension of said bore and about equal to said large dimension of said bore, said screw being mounted in said pocket with said shank positioned in said bore.

* * * * *

UNITED STATES PATENT AND TRADEMARK OFFICE
CERTIFICATE OF CORRECTION

PATENT NO. : 6,877,536 B2 Page 1 of 1
APPLICATION NO. : 10/759575
DATED : April 12, 2005
INVENTOR(S) : Max W. Durney It is certified that error appears in the above-identified patent and that said Letters Patent is hereby corrected as shown below:

Column 13,
Line 1, replace "bore to, said shank" with -- bore, said shank --.
Line 3, replace "said bore us a result" with -- said bore as a result --.

Signed and Sealed this

Twentieth Day of June, 2006

JON W. DUDAS
*Director of the United States Patent and Trademark Office*